United States Patent
Joyer et al.

(10) Patent No.: US 10,386,219 B2
(45) Date of Patent: Aug. 20, 2019

(54) SHOWER HEAD NOZZLE

(71) Applicant: Haws Corporation, Sparks, NV (US)

(72) Inventors: Michael Joyer, Sparks, NV (US); Daniel Small, Sparks, NV (US)

(73) Assignee: Haws Corporation, Sparks, NV (US)

( * ) Notice: Subject to any disclaimer, the term of this patent is extended or adjusted under 35 U.S.C. 154(b) by 310 days.

(21) Appl. No.: 15/350,964

(22) Filed: Nov. 14, 2016

(65) Prior Publication Data

US 2017/0135529 A1  May 18, 2017

Related U.S. Application Data

(60) Provisional application No. 62/255,339, filed on Nov. 13, 2015.

(51) Int. Cl.

| | | |
|---|---|---|
| *A47K 3/28* | (2006.01) | |
| *B05B 1/18* | (2006.01) | |
| *G01K 1/14* | (2006.01) | |
| *A61H 33/00* | (2006.01) | |
| *A61H 35/00* | (2006.01) | |
| *A61H 35/02* | (2006.01) | |
| *B05B 12/00* | (2018.01) | |
| *F16L 37/18* | (2006.01) | |
| *G01F 15/18* | (2006.01) | |
| *G01K 13/02* | (2006.01) | |
| *B05B 15/654* | (2018.01) | |

(52) U.S. Cl.
CPC .......... *G01F 15/185* (2013.01); *A47K 3/286* (2013.01); *A61H 35/00* (2013.01); *B05B 1/18* (2013.01); *B05B 1/185* (2013.01); *B05B 12/002* (2013.01); *B05B 12/008* (2013.01); *B05B 15/654* (2018.02); *F16L 37/18* (2013.01); *G01K 1/14* (2013.01); *G01K 13/02* (2013.01); *A61H 35/02* (2013.01); *A61H 2033/0033* (2013.01); *A61H 2201/5043* (2013.01); *A61H 2201/5082* (2013.01); *G01K 2013/026* (2013.01)

(58) Field of Classification Search
CPC ....... B05B 1/185; B05B 15/654; B05B 15/65; G01F 15/185; G01K 1/14; G01K 2013/026

See application file for complete search history.

(56) References Cited

U.S. PATENT DOCUMENTS

| | | | | |
|---|---|---|---|---|
| 5,160,197 A | * | 11/1992 | Klose | ............... E03C 1/0409 374/147 |
| 2004/0217196 A1 | * | 11/2004 | Yurek, Jr. | ............... E03C 1/021 239/289 |

* cited by examiner

*Primary Examiner* — Paul M. West
(74) *Attorney, Agent, or Firm* — Cesari & McKenna, LLP

(57) ABSTRACT

The shower head nozzle as disclosed herein includes a quick-connect coupling for selectively attaching the nozzle to a downwardly extending conduit or tube for directing tested water through a test unit and into a bucket or drain, wherein the test unit may include a flow meter for measuring real-time water flow rate and a temperature sensor for measuring real-time water temperature dispensed from the shower head, thereby reducing the testing time, more accurately determining flow-rate and water temperature, and decreasing the amount of waste water.

24 Claims, 11 Drawing Sheets

SHOWER HEAD NOZZLE

CROSS-REFERENCE TO RELATED APPLICATION

This application is based upon and claims priority to U.S. provisional patent application 62/255,339, entitled "Shower Head Nozzle," filed Nov. 13, 2015.

BACKGROUND OF THE INVENTION

The present invention generally relates to a shower head nozzle for use with emergency showers and the like. More specifically, the present invention relates to a shower nozzle having an integrated quick-coupling for select drip-tight attachment to a drain system for use in more accurately testing the functionality (e.g., flow rate and water temperature) of an emergency shower or the like.

The Occupational Safety and Health Administration ("OSHA") requires that facilities provide, for immediate emergency use, equipment for quick drenching or flushing of the eyes and body within work areas where the eyes or body of any person may be exposed to injurious or corrosive materials. Such drenching or flushing devices known in the art may include an eyewash unit, an eye/face wash unit, a shower, or a combination eye/face wash unit and shower, depending on the surrounding work environment. The American National Standards Institute ("ANSI") developed a set of guidelines related to the installation and maintenance of these emergency eye/face wash units and emergency shower equipment, to better ensure safety and OSHA compliance.

In this respect, ANSI recommends weekly testing of emergency eye/face wash units and safety showers. This is to ensure that the emergency eye/face wash and/or safety showers are functional in the event of an emergency. In particular, shower testing can be particularly messy due to the large amount of water dispensed from the shower head during the test. For example, one known method for containing water dispensed from the shower head during the weekly ANSI test is to use a shower sock, such as the Emergency Shower Test Kit sold by Northern Safety Co., Inc. of P.O. Box 4250, Utica, N.Y. 13504-4250. The shower sock is a cylindrical tube of about 12 inches in diameter and made from vinyl or laminated plastic sheets. The diameter of the shower sock is designed to fit over a shower head and direct water into an underlying bucket or drain. The shower sock may be hung on the shower piping or manually held about the shower head, but it can be difficult to install or hold the shower sock in this manner.

The purpose of the shower sock is to radially contain water emitted from the shower head during a weekly ANSI test. But, the shower sock has limited application in this respect because it can only contain and direct water downwardly, such as to an underlying drain or bucket (if no drain is present). One problem known in the art with this design is that the shower sock may not contain all water emitted from the shower head during the ANSI test (e.g., the shower sock has no way of preventing water from spraying out through the open top or the open bottom). Moreover, the shower sock is also prone to damage from the high-velocity water spray, which can delaminate the plastic sheets or rip the sock off the support ring. Additionally, the flimsy vinyl or laminated plastic sheets are not exactly durable and, over time, may develop small tears or holes that no longer adequately retain the water emitted from the shower head. Consequently, all water may not be adequately contained by the shower sock during the test. This can be particularly problematic and act as a testing deterrent for some customers, especially when emergency showers are located in water-sensitive locations (e.g., a semiconductor laboratory where water may ruin manufacturing equipment).

Moreover, the ANSI testing procedure includes parameters for ensuring adequate water flow rate and water temperature. But, current methods for testing the water flow rate and water temperature are less than accurate. For example, testing the ANSI water flow rate may simply include placing a large bucket underneath the shower, dispensing water into the bucket, and recording the dispensing time. The flow rate is then calculated manually, i.e., as a function of the amount of water dispensed into the bucket over the recorded time frame. This process is typically used in association with the above-mentioned shower sock. But, this testing process can be particularly ineffective as the measurements are prone to error (e.g., water loss and/or timing differentials). Moreover, this process produces an undesirably large amount of waste water. The water temperature measure may also be inaccurate as the water may immediately cool off in the air between the shower head and bucket, and may gradually cool even further in the event the water temperature is measured at some point after the bucket has been filled with water.

There exists, therefore, a significant need in the art for a shower head nozzle that includes a quick-connect coupling for selectively attaching the nozzle to a downwardly extending conduit or tube for directing tested water through a test unit and into a bucket or drain, wherein the test unit may include a flow meter for measuring real-time water flow rate and a temperature sensor for measuring real-time water temperature dispensed from the shower head, thereby reducing the testing time, more accurately determining flow-rate and water temperature, and decreasing the amount of waste water. The present invention fulfills these needs and provides further related advantages.

SUMMARY OF THE INVENTION

One embodiment of a shower head nozzle as disclosed herein may include an elongated body having a hollow interior for channeling fluid therethrough. A first end of the elongated body may be configured to selectively couple to an emergency wash unit in fluid communication with a fluid source. This permits fluid coupling of the shower head nozzle with the fluid source by way of the emergency wash unit. Furthermore, a second end of the elongated body opposite the first end thereof may be configured to selectively receive and dispense fluid. More specifically, the second end may include the combination of a dispense outlet having a size and shape to selectively at least partially outwardly dispense fluid therefrom when the emergency wash unit is in an activation state and a recessed engagement groove formed in an outer periphery of the elongated body projecting outwardly from the emergency wash unit and proximate the dispense outlet. The recessed engagement groove may have a size and shape for select direct water-tight attachment to a quick-connect coupler for confined channeling of fluid from the dispense outlet to a remote location when the emergency wash unit is in the activation state.

The elongated body may include a cylindrical body and the recessed engagement groove may include a reciprocal circumferential recessed engagement groove having a diameter relatively smaller than a cylindrical cam-lock of the quick-connect coupler. In one embodiment, the recessed engagement groove may couple to the quick-connect coupler by snap-fit engagement. Moreover, the elongated body may include a step that transitions the first end with a first relatively larger cross-section to an intermediate section adjacent the recessed engagement groove having a second relatively smaller cross-section. The step is then able to facilitate select engagement with the emergency wash unit, such as by way of engagement with a shoulder in the emergency wash unit that retains the shower head nozzle in place. Although, of course, the shower head nozzle may also selectively threadingly engage the emergency wash unit, such as by internal or external threads. Moreover, while the second end may project outwardly from the emergency wash unit when mounted thereto, the first end may be mounted within the emergency wash unit in non-projecting relation relative thereto. Lastly, the dispense outlet may include an outwardly diverging internal diameter that helps at least partially outwardly radially dispense fluid from the emergency wash unit and the first end may include a universal connector selectively engageable with multiple other emergency wash units.

In another aspect of this embodiment, a fluid conduit may fluidly couple to and extend between the quick-connect coupler and a remote drain or a storage tank. Here, a flow meter may be positioned in-line with the fluid conduit, e.g., in series or in the conduit itself, for measuring a real-time flow rate of the fluid flowing through the dispense outlet when the emergency wash unit is in the activation state. Similarly, a temperature sensor may also be placed in-line with the fluid conduit for measuring a real-time water temperature of the fluid flowing through the dispense outlet when the emergency wash unit is in the activation state. Moreover, the fluid conduit may selectively couple to a portable storage tank for selectively receiving a quantity of fluid approximately equal to an ANSI test quantity. The portable storage tank may be associated with a portable storage and testing unit that includes a controller for recording a real-time flow rate and a real-time temperature of fluid flowing out from the dispense outlet. This may allow for smart tracking.

In another embodiment as disclosed herein, the shower head nozzle may include an elongated cylindrical body having a hollow interior for channeling fluid therethrough. An upper end of the elongated cylindrical body may be configured to couple to an emergency shower unit in fluid communication with a fluid source. The upper end may include a universal connector that selectively engages with multiple emergency shower units. Additionally, a lower end of the elongated cylindrical body may be configured to selectively receive and dispense fluid from the hollow interior. Here, the lower end may include the combination of a dispense outlet having an outwardly diverging internal diameter for at least partially outwardly radially dispensing fluid from the emergency shower unit and a circumferential recessed engagement groove formed in an outer diameter of the elongated cylindrical body and proximate the dispense outlet. The circumferential recessed engagement groove may have a diameter relatively smaller than a cylindrical cam-lock of a quick-connect coupler for select water-tight snap-fit engagement therewith for constraining the at least partially outwardly radially dispensing fluid into a conduit coupled to the quick-connect coupler.

In this embodiment, the conduit may include a pipe fitting or a hose fluidly coupled to and extending between the quick-connect coupler and a remote drain or a storage tank. Moreover, the elongated cylindrical body may include a step transitioning the upper end having a first relatively larger diameter to an intermediate section adjacent the circumferential recessed engagement groove having a second relatively smaller diameter. As mentioned herein, the step may facilitate select engagement with the emergency shower unit so that the upper end may be concealed within the body of the emergency shower unit while the lower end projects outwardly relative thereto for engagement with the quick-connect coupler. To this end, the cylindrical cam-lock may include a diameter of at least one inch and attach over the exterior circumference of the lower end of the shower head nozzle.

A temperature sensor may be positioned in-line with the conduit for measuring a real-time water temperature of the fluid flowing through the dispense outlet when the emergency shower unit is in an activation state. Alternatively or in addition to, a flow meter may be positioned in-line with the conduit for measuring a real-time flow rate of the fluid flowing through the dispense outlet when the emergency shower unit is similarly in the activation state. In one embodiment, the conduit may selectively couple to a portable storage tank for selectively receiving a quantity of fluid approximately equal to an ANSI test quantity for testing purposes. Here, the portable storage tank may be associated with a portable testing unit that includes a controller for recording the real-time flow rate and/or the real-time temperature of fluid flowing out from the dispense outlet. The portable testing unit may also include a screen for displaying the real-time flow rate and the real-time temperature as each are being measured or monitored.

In another aspect of the embodiments disclosed herein, a process for testing an emergency shower unit may include steps for mounting a first end of a shower head nozzle having an elongated body with a hollow interior for channeling fluid therethrough to a shower head with a second end thereof projecting outwardly therefrom and having the combination of a dispense outlet for at least partially outwardly directing dispensing fluid therefrom and a recessed engagement groove formed in an outer periphery of the elongated body. A quick-connect coupler may be attached directly to the recessed engagement groove of the shower head nozzle in water-tight relation. The emergency shower unit may be activated to produce a fluid flow to the shower head nozzle and out through the dispense outlet. Here, the quick-connect coupler may confine the fluid flow into a conduit coupled thereto for delivery to a remote location (e.g., a drain or a storage tank), as opposed to permitting at least partial outward dispensing of the fluid flow from the dispense outlet (e.g., as a result of the dispense outlet including an outwardly diverging internal diameter) when the quick-connect coupler is not attached to the recessed engagement groove.

Additionally, at least one of a flow rate or a temperature of the fluid flow may be measured or read in real-time. More specifically, the measuring step may include measuring the real-time flow rate with a flow meter in-line with the conduit and/or measuring the real-time temperature with a temperature sensor or probe disposed within the conduit. Additionally, the real-time flow rate and/or the real-time temperature may be recorded for later review and/or analysis and a screen may display the real-time flow rate and/or the real-time temperature for viewing in real-time. The readings and other information may be measured and/or stored in connection with a testing unit having a portable storage tank coupled to the conduit. The portable storage tank may include a storage capacity that receives and/or retains a quantity of fluid approximately equal to an ANSI test quantity. Once complete, the emergency shower unit may be deactivated to cease the fluid flow through the dispense outlet of the shower head nozzle.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
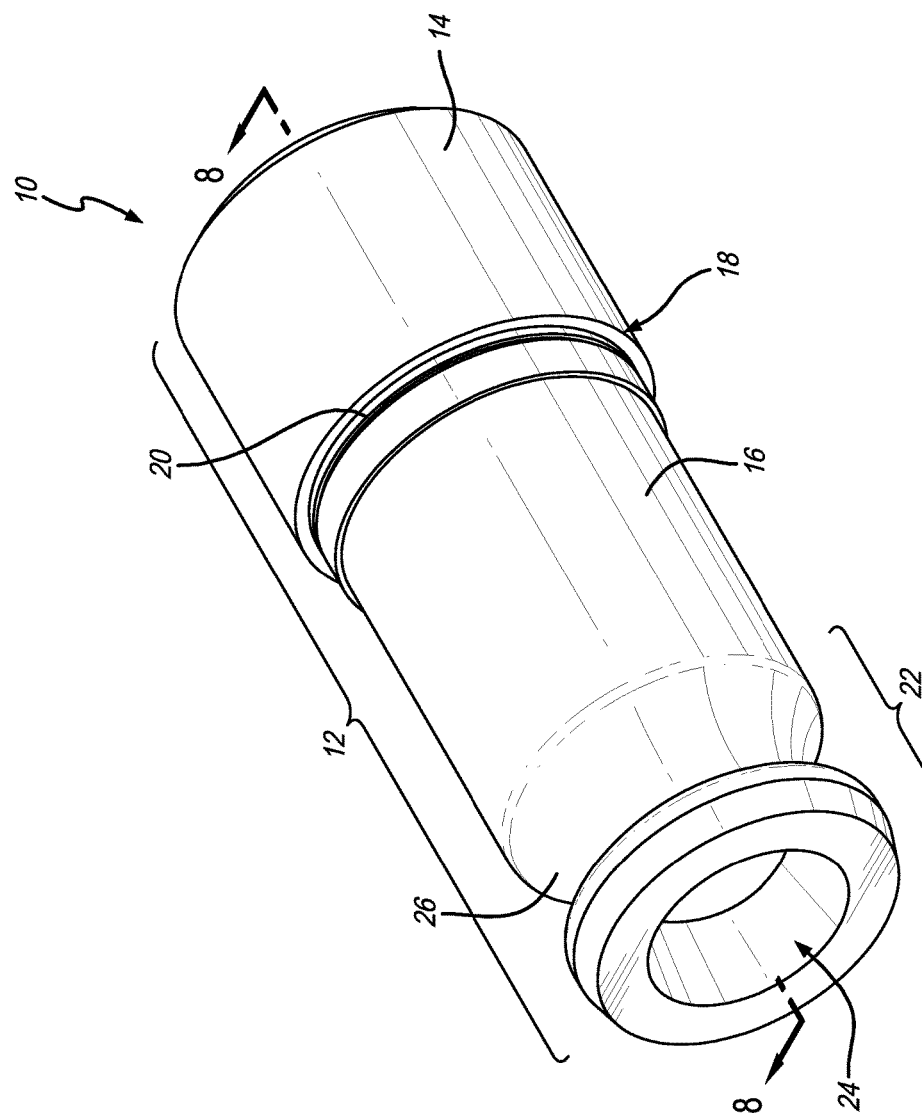
FIG. 1 is a perspective view illustrating the front, top and right sides of one embodiment of a shower head nozzle as disclosed herein.
Figure 2:
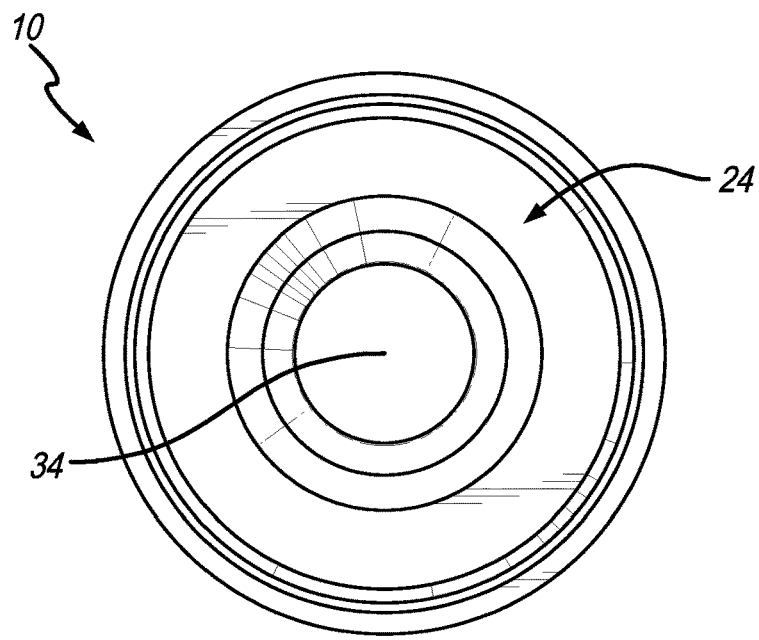
FIG. 2 is a front elevation view of the shower head nozzle of FIG. 1.
Figure 3:
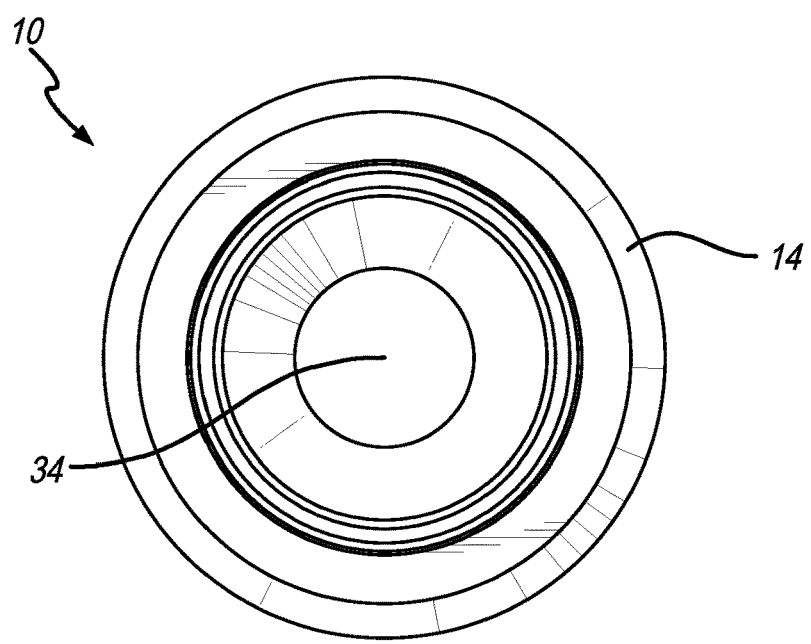
FIG. 3 is a rear elevation view of the shower head nozzle of FIG. 1.
Figure 4:
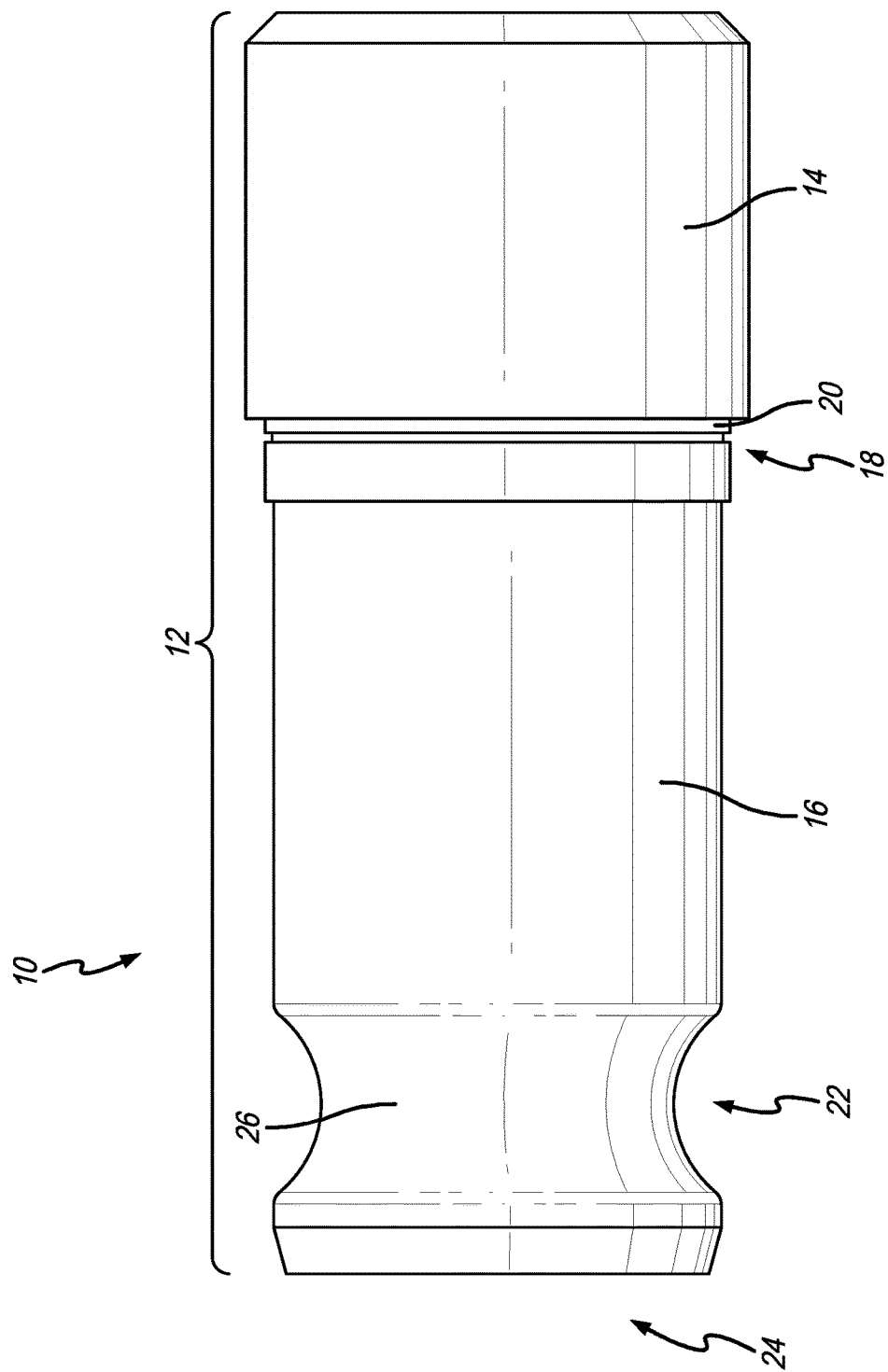
FIG. 4 is a right side elevation view of the shower head nozzle of FIG. 1.
Figure 5:
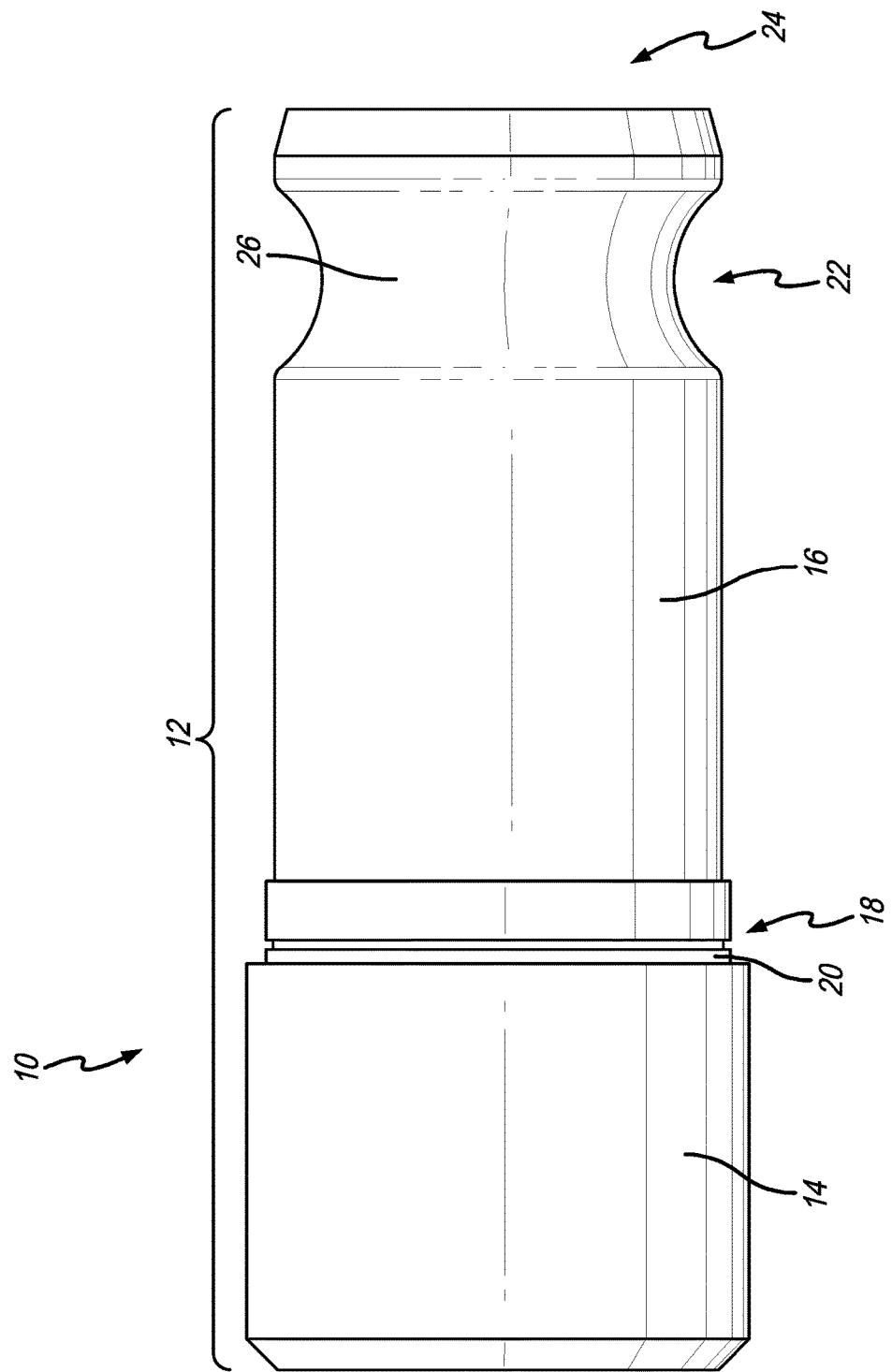
FIG. 5 is a left side elevation view of the shower head nozzle of FIG. 1.
Figure 6:
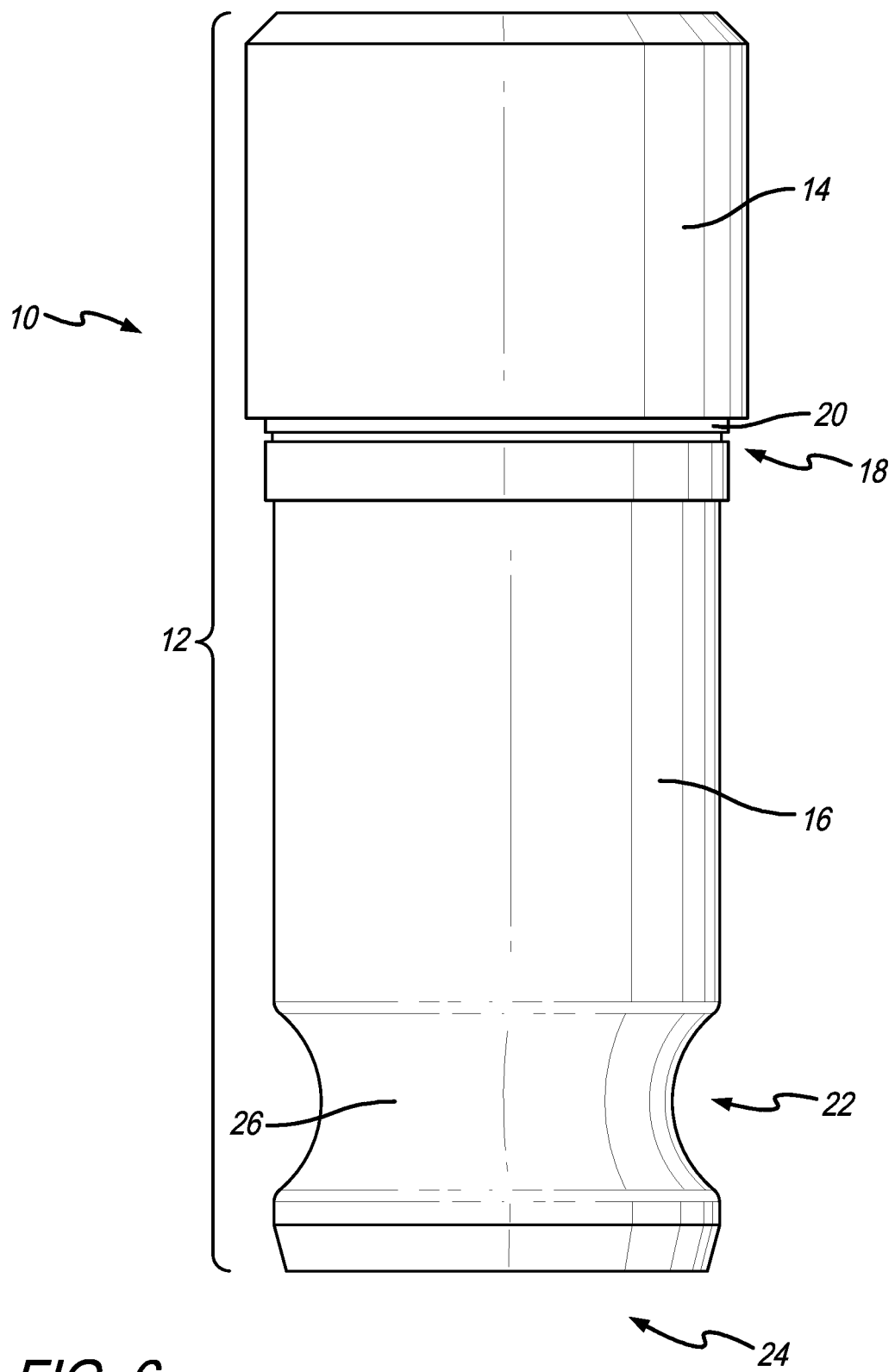
FIG. 6 is a top plan view of the shower head nozzle of FIG. 1.
Figure 7:
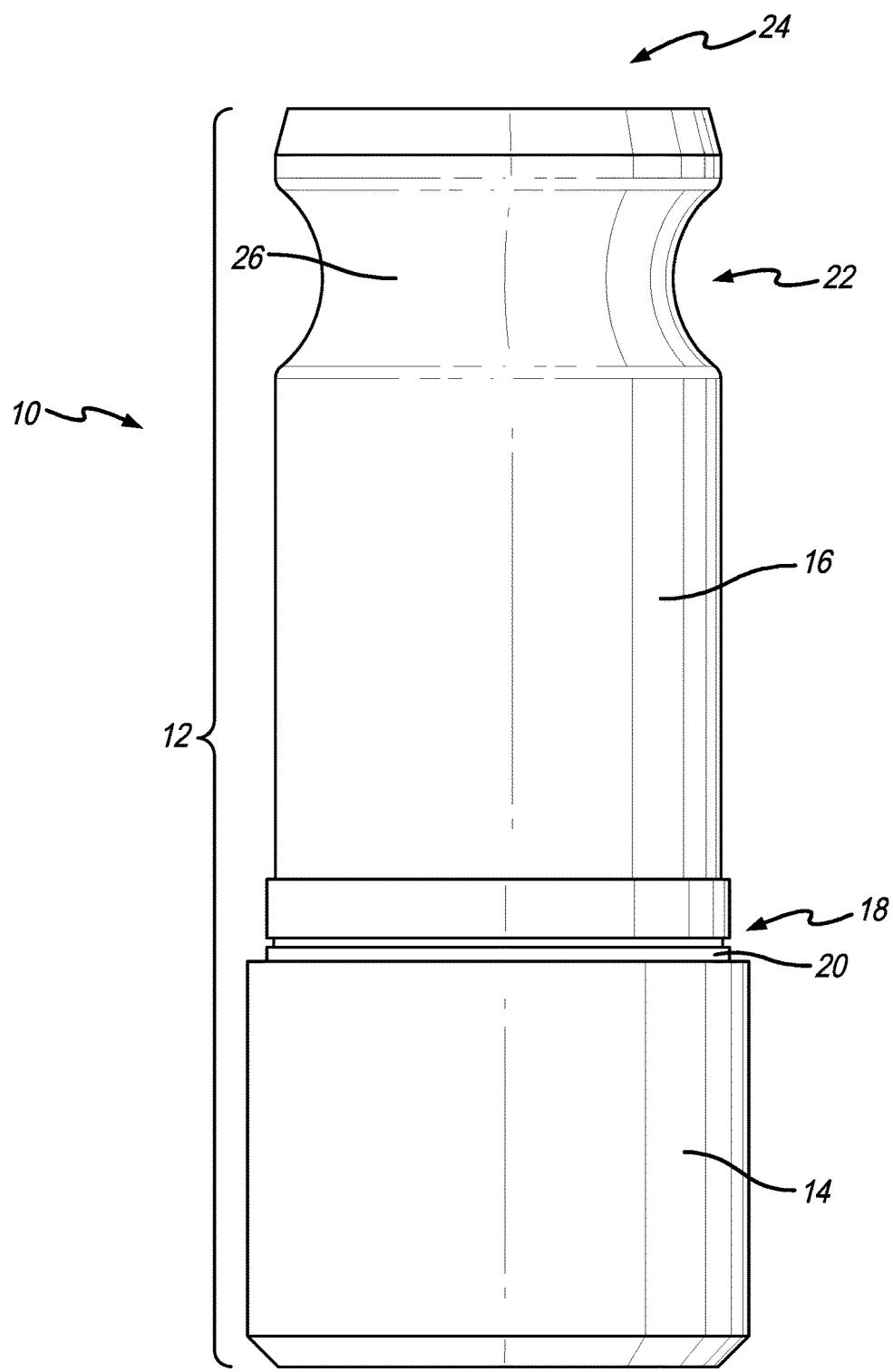
FIG. 7 is a bottom plan view of the shower head nozzle of FIG. 1.
Figure 8:
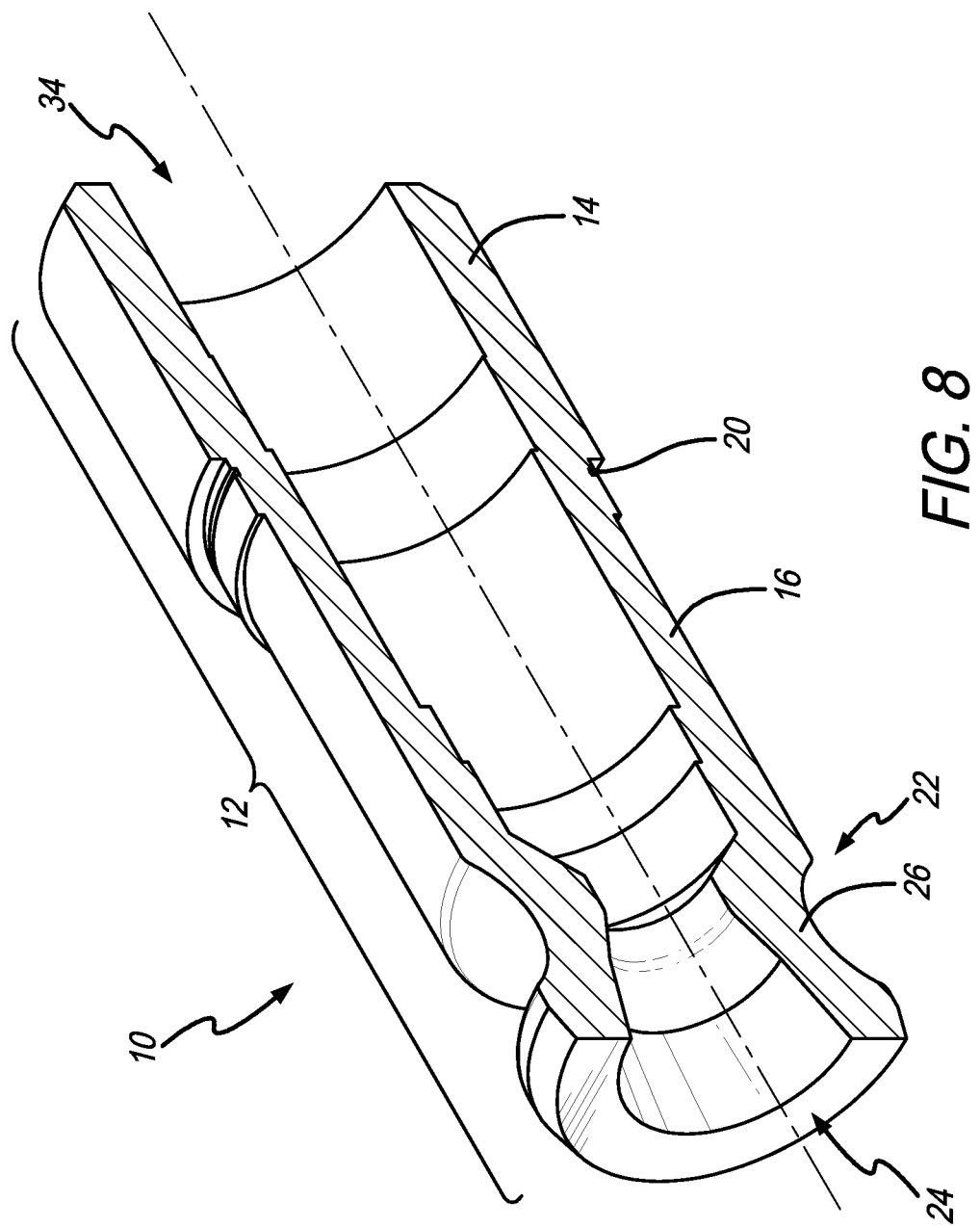
FIG. 8 is a cross-sectional view of the shower head nozzle taken about the line 8-8 in FIG. 1.

As shown in the exemplary drawings for purposes of illustration, one embodiment of an improved show head nozzle as disclosed herein is generally referred to in FIGS. 1-12 by reference numeral 10. Preferably, the shower head nozzle 10 includes integration of a quick-connection profile that permits attachment directly into the body of the shower head nozzle 10 to more quickly and accurately perform a weekly ANSI test on an emergency shower or the like.

More specifically with respect to FIGS. 1-8, one embodiment of the shower head nozzle 10 is shown having an elongated cylindrical body 12 with an upper end 14 formed next to a relatively smaller diameter intermediate section 16. In this respect, the transition area 18 between the upper end 14 and the intermediate section 16 may include a ledge or step 20 that allows the upper end 14 to be selectively engaged or otherwise be retained within the shower head (not shown). The intermediate section 16 then projects downwardly from the shower head fixture, thus extending a quick-coupling section 22 and a dispense outlet 24 out therefrom for easy external accessibility.

In this embodiment, the quick-coupling section 22 includes a recessed or relatively smaller diameter engagement groove 26 circumferentially formed around the outer diameter of the quick-coupling section 22 of the shower head nozzle 10. In one embodiment, the engagement groove 26 is of a size and shape to selectively couple to a camlock 28 (FIGS. 9 and 10), such as Model SP829 manufactured and sold by ProFlow Dynamics of 330 South Maple Street, Units F-H, Corona, Calif. 92880. Although, the engagement groove 26 may be of a size and shape to couple with other cam locks known in the art, such as those that may be manufactured in accordance with the traditional United States Military Specification MIL-C-27487 or the more recent United States Federal Standard A-A-59326. In this respect, the camlock 28 preferably includes a relatively larger inner diameter (e.g., 1 inch or larger) that engages the relatively smaller outer diameter of the quick-coupling section 22 for engagement within the engagement groove 26. Although, of course, the engagement groove 26 may be of any shape or size known in the art such that the quick-coupling section 22 includes an external profile configured to accept an industry-standard cam-lock hose fitting. This permits rapid water-tight connection of the camlock 28 to the shower head nozzle 10 for purposes of performing the above-mentioned ANSI test, and one step removal therefrom when the testing is finished.

Figure 9:
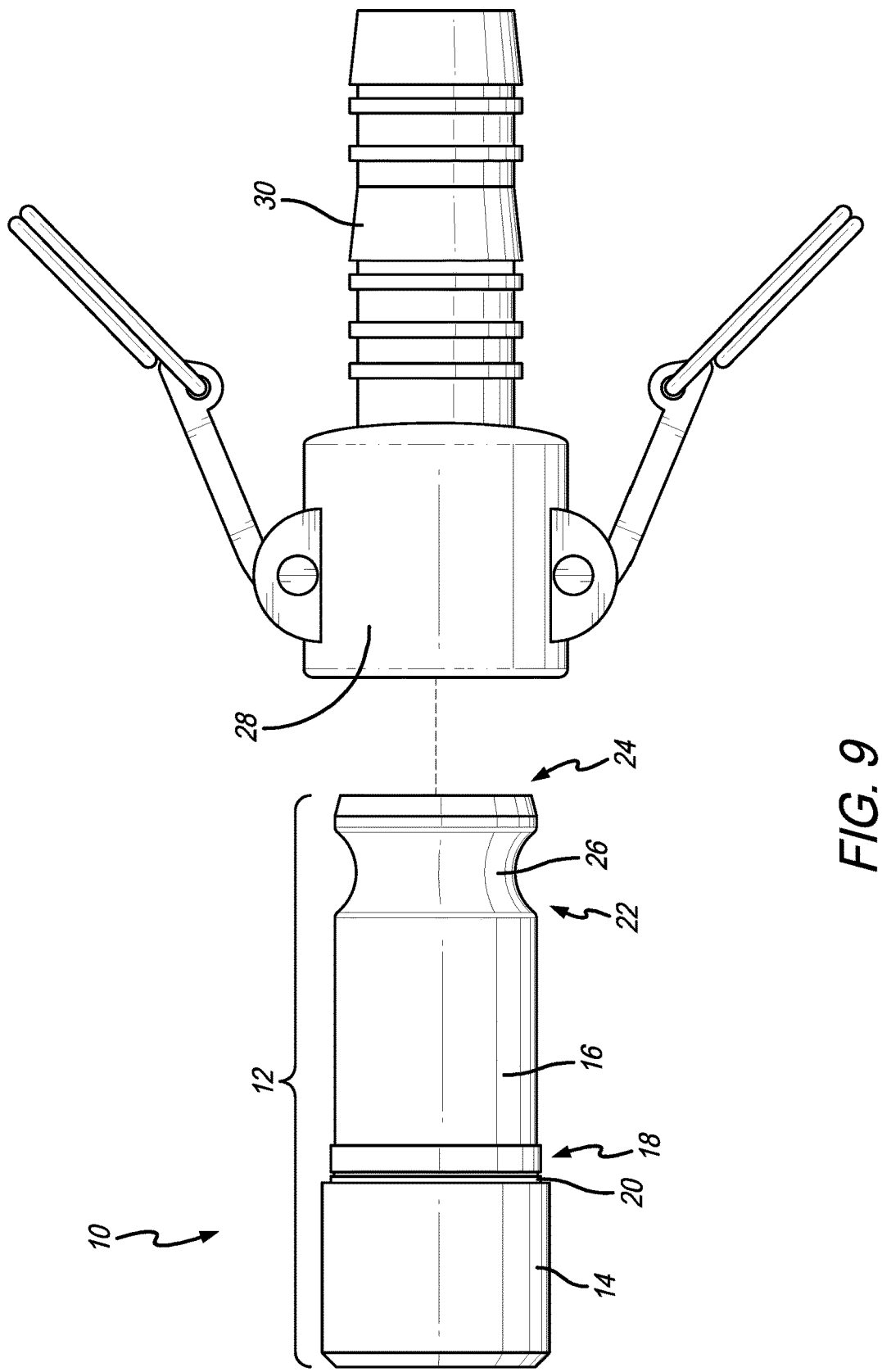
FIG. 9 is a perspective view illustrating the shower head nozzle spaced apart from a cam-lock.
Figure 10:
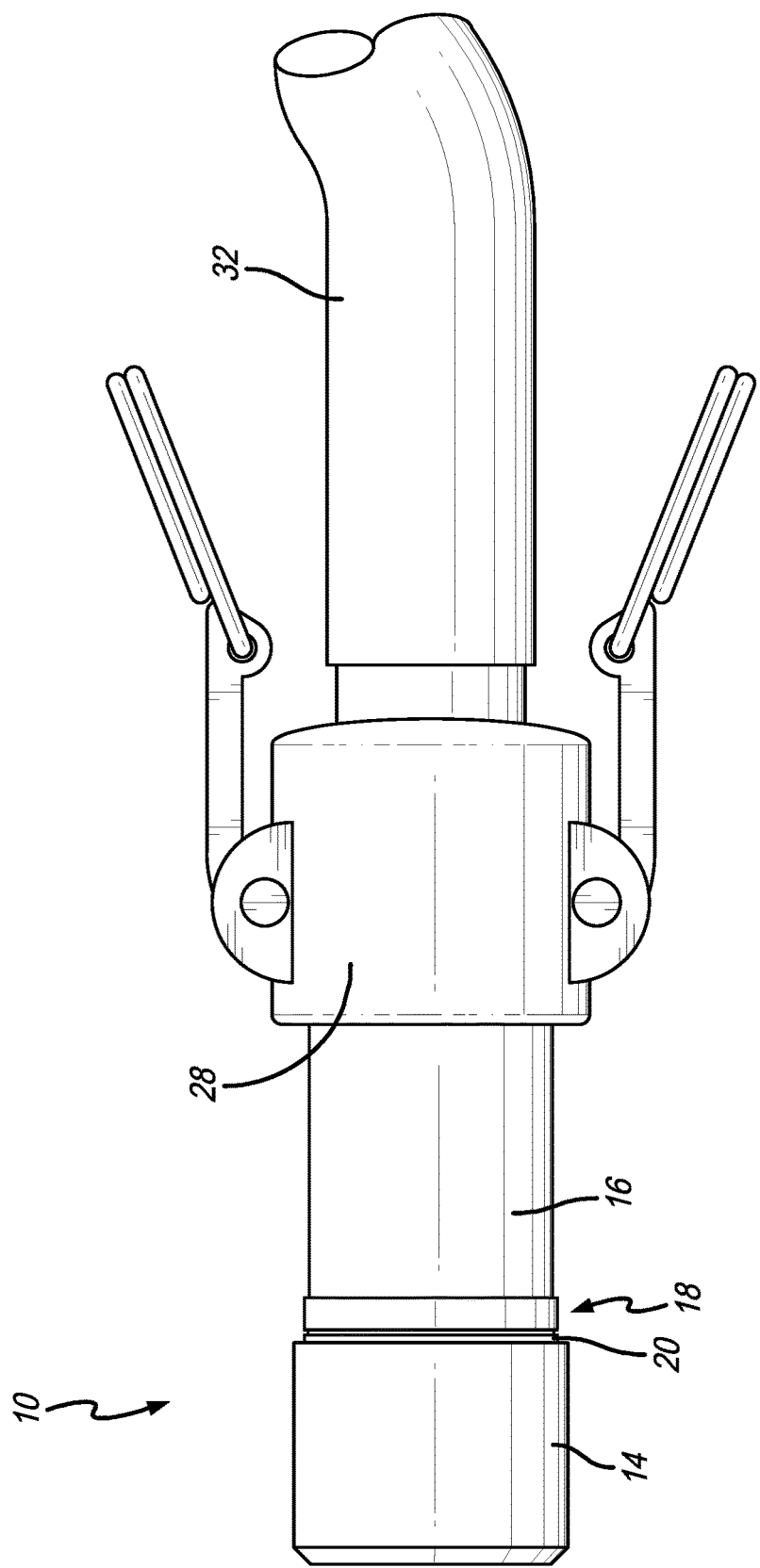
FIG. 10 is a perspective view similar to FIG. 9, illustrating engagement of the shower head nozzle with the cam-lock.

As shown in FIGS. 9 and 10, the camlock 28 may include a corrugated end 30 having a size and shape suitable for water tight retention of a hose 32 (e.g., a rubber hose) or the like known in the art. In this respect, attachment of the camlock 28 to the engagement groove 26 in the shower head nozzle 10, as mentioned above, facilitates water-tight coupling of the hose 32 thereto. The hose 32 may then retain and channel water dispensed out the outlet 24 to a desired location. For example, water dispensed through a flow conduit 34 in the nozzle 10 may be directed to the hose 32 to a local drain (e.g., a relatively short hose), a remote drain (e.g., a relatively longer hose or conduit), or to a portable tank or testing unit to create a non-leaking, self-contained system during the ANSI test. As such, the hose 32 may vary in length and may be flexible or rigid, depending on the use. This setup provides cleaner and more efficient water flow characteristics when compared, especially, to trying to capture the radially dispensing water with the aforementioned shower sock. To this end, coupling the camlock 28 to the shower head nozzle 10 permits replacement of the aforementioned shower sock.

Another advantage of the shower head nozzle 10 with the quick-coupling section 22 disclosed herein, such as the engagement groove 26 and the camlock 28, is that it is easier and quicker to perform the ANSI water flow rate and water temperature testing. For example, an operator can more easily verify compliance to ANSI water flow and temperature standards using measurement instruments coupled to the drain hose 32, if one is connected to the corrugated end 30, for example. Directly measuring flow rate and water temperature at or near the dispense outlet 24 of the shower head nozzle 10 may be more accurate and quicker than the manual methods mentioned above used with the shower sock. As a result, a flow meter (not shown) may determine the flow rate from the dispense outlet 24 almost immediately or in real-time.

In another aspect of the embodiments disclosed herein, the hose 32 could couple to a mobile test cart. In this embodiment, the mobile test cart may include a water collection tank, a flow meter, a temperature probe or the like, a storage compartment for the water connection hose 32, and/or an electronic interface for recording the test results, such as shower location, water flow rate, water temperature, test duration, test date and time, etc. The mobile test cart with water collection tank could be transported to a remote location for draining. This feature may be beneficial when the emergency shower is installed in a water-sensitive location, such as semiconductor fabrication laboratory or in multi-story facilities.

In other embodiments, the quick-coupling section 22 may include other mechanisms for providing internal or external coupling of the dispense outlet 24 to the hose 32 or the like, for channeling water from the nozzle 10 during an ANSI test. For example, the quick-coupling section 22 may be configured for snap-fit engagement with a pipe fitting or hose. In another embodiment, the quick-coupling section 22 may be configured to rotatably engage another pipe fitting. For example, the dispense outlet 24 may include a series of external or internal threads (not shown) configured for threaded engagement to a pipe fitting having a similar corrugated end 30 suitable for connection to a rubber hose 32 or the like. In each of these embodiments, the shower head nozzle 10 preferably directs water into a channeled tube or hose to increase the efficiency and accuracy of conducting the weekly ANSI compliance test of the water flow rate and water temperature, such as by way of enhanced coupling with instruments coupled to the drain hose or testing unit.

In general, the shower head nozzle 10 disclosed herein may be used with virtually any emergency shower or eye/face wash unit known in the art. Moreover, having a non-leaking, locking hose connection allows for the possibility to more easily verify emergency shower ANSI compliance by connecting a flow meter and/or temperature probe directly to the shower head. These instruments allow for direct testing of the shower water in a significantly shorter time period (e.g., potentially only a few seconds). The short testing time minimizes the amount of waste water generated and allows for faster testing cycles, which increases the accuracy of the tests.

Figure 11:
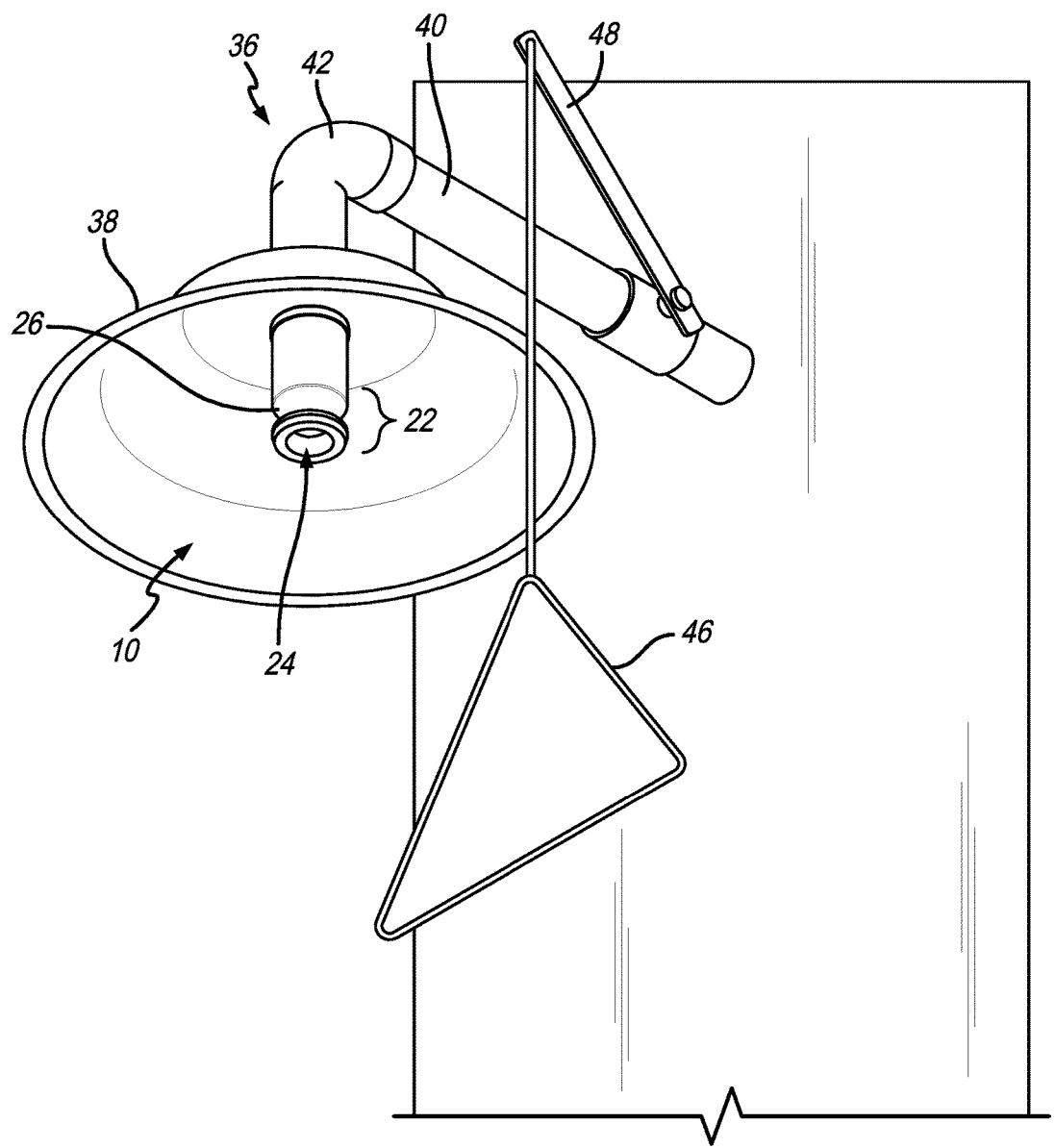
FIG. 11 is an environmental perspective view illustrating the shower head nozzle extending out from a emergency shower known in the art.
Figure 12:
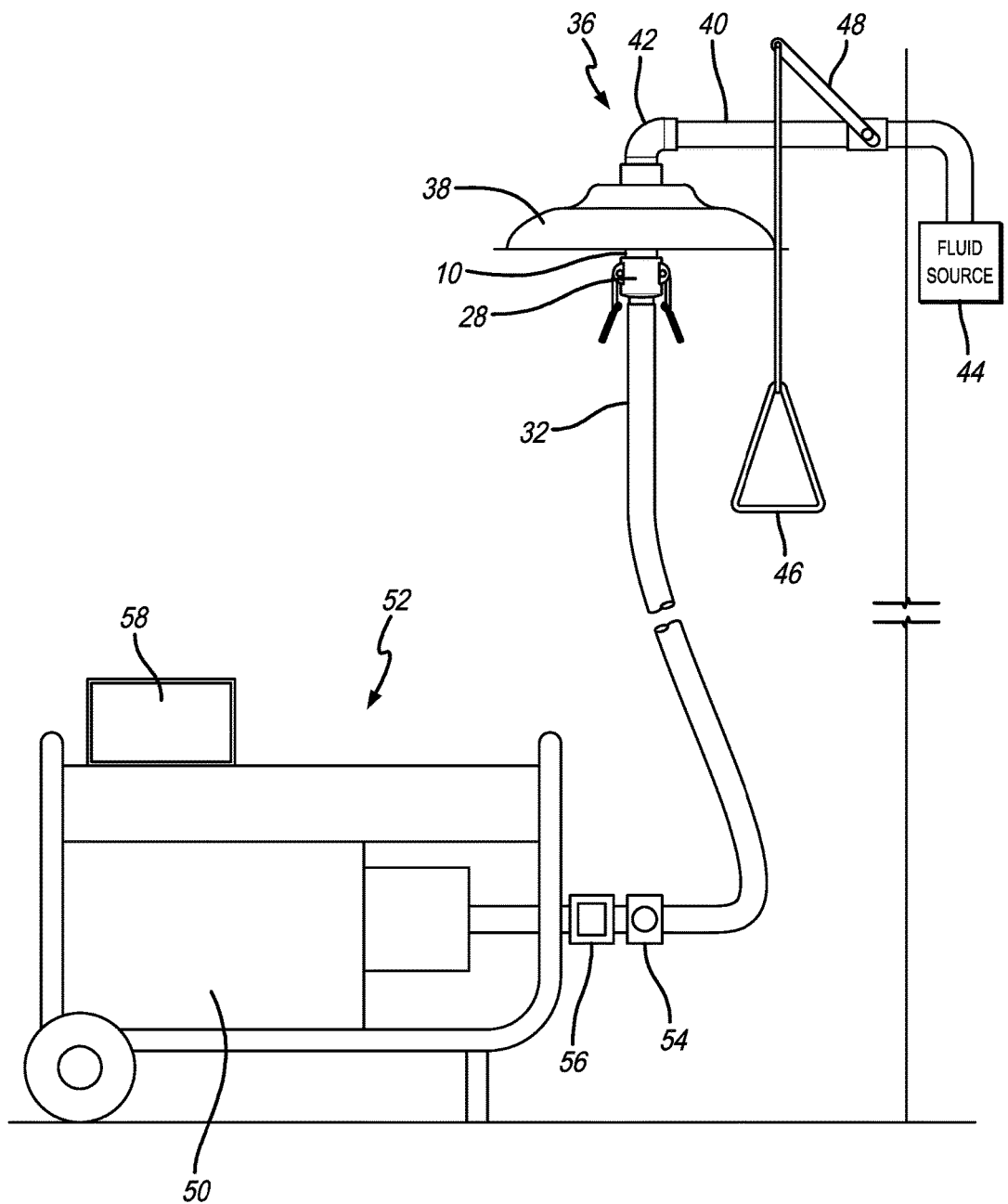
FIG. 12 is an environment perspective view illustrating the shower head nozzle coupled to the cam-lock and having a tube extending therefrom for connection to a portable testing unit.

FIGS. 11 and 12 illustrate the shower head nozzle 10 integrated into an emergency shower 36. More specifically with respect to FIG. 11, the shower head nozzle 10 couples to the emergency shower 36 up underneath a shower head 38 in the general shape of a downwardly facing cone. The shower head 38 helps ensure that water dispensed from the dispense outlet 24 is generally directed downwardly over a person (not shown) standing underneath. In one embodiment, the shower head nozzle 10 may include a series of internal or external threads that facilitate threaded water-tight engagement with the emergency shower 36, such as where a shower head conduit 40 terminates just below an elbow 42 (the elbow 42 may turn the otherwise horizontal conduit 40 approximately 90 degrees so the shower head conduit 40 dispenses water downwardly). Although, the shower head nozzle 10 may couple to the shower head conduit 40 by snap-fit engagement, lock-tight engagement, or other attachment mechanisms known in the art for connecting conduits in substantially permanent water-tight relation.

In this respect, the shower head conduit 40 of the emergency shower 36 may couple to a fluid source 44 (FIG. 12) for supplying a quantity of fluid to the shower head nozzle 10, such as in an emergency or for testing purposes. The fluid source 44 may be a mains water source, i.e., a pressurized water source that supplies a constant stream of pressurized water to the shower head nozzle 10. Alternatively, the fluid source 44 may be a storage tank (e.g., a gravity tank) that supplies a select quantity of water to the shower head nozzle 10. In the latter embodiment, water dispensed from such a storage tank would need to be replaced or replenished after use.

Additionally, the emergency shower 36 may include a handle 46 that couples to a lever 48 that may operate a valve (not shown) internally located within the shower head conduit 40. In FIGS. 11 and 12, the emergency shower 36 is shown in a deactivated state, i.e., the handle 46 is in a relatively raised position and the internally placed valve is in a closed position blocking the flow of fluid from the fluid source 44 to the shower head nozzle 10. Pulling down on the handle 46 may activate the emergency shower 36 by rotating or pivoting the level 48, thereby operating the internal valve, i.e., moving the valve from a closed position substantially blocking fluid flow through the shower head conduit 40 to an open position substantially permitting fluid flow through the shower head conduit 40. Activation may thus cause water to dispense out through the shower head nozzle 10. The emergency shower 36 may be activated in this manner in an emergency or for testing purposes.

While one embodiment of an emergency shower is disclosed with respect to FIGS. 11 and 12, a person of ordinary skill in the art will readily recognize that the shower head nozzle 10 as disclosed herein may be used with other emergency showers as may be known in the art.

Moreover, FIG. 12 illustrates an embodiment wherein the emergency shower 36 may be tested, e.g., for ANSI compliance. As shown, the cam-lock 28 is connected to the shower head nozzle 10 at one end and has the hose 32 connected thereto at another end. As mentioned above, activating the emergency shower 36 causes fluid to flow through the shower head conduit 40 to the shower head nozzle 10. Although, instead of the shower head nozzle 10 generally dispensing water therefrom at least partially radially outwardly, the fluid is instead channeled into a confined conduit in the cam-lock 28 coupled thereto. The fluid then travels to the hose 32 for eventual disposal (e.g., a drain) or storage (e.g., within a storage tank 50 of a portable storage and testing unit 52, as shown in FIG. 12).

In the embodiment shown with respect to FIG. 12, fluid flowing through the hose 32 to the portable storage and testing unit 52 may travel through a flow meter 54 for measuring the real-time flow rate of water being dispensed from the emergency shower 36 and/or may flow through a temperature sensor 56 for measuring the temperature of the fluid in real-time. The information may be collected and stored in the portable storage and testing unit 52, such as to ensure ANSI compliance. Moreover, the real-time flow rate and/or real-time temperature information may be shown to a user during testing by way of a display 58, which may selectively pop up from the portable storage and testing unit 52. The display 58 may provide the aforementioned real-time fluid flow or temperature details (e.g., during a test) or other historical or ANSI compliance details, as needed and/or desired. The fact that the shower head nozzle 10 includes the dispense outlet 24, which may include an outwardly expanding internal diameter to at least partially radially dispense water therefrom, in combination with the quick-coupling section 22, for quick attachment and/or release with the cam-lock 28, better facilitates use and testing of the emergency shower 36, especially relative to those devices known in the prior art (e.g., the aforementioned sock). To this end, concentrating the fluid flow out through the cam-lock 28 and into the hose 32 further facilitates accurately determining the flow-rate and fluid temperature characteristics, and in less time than conventional systems known in the art since the cam-lock 28 may facilitate one step attachment or disconnection.

Although several embodiments have been described in detail for purposes of illustration, various modifications may be made without departing from the scope and spirit of the invention. Accordingly, the invention is not to be limited, except as by the appended claims.

What is claimed is:

1. A shower head nozzle, comprising:
an elongated body having a hollow interior for channeling fluid therethrough;
a first end of the elongated body is configured to selectively couple to an emergency wash unit in fluid communication with a fluid source; and
a second end of the elongated body opposite the first end thereof is configured to selectively receive and dispense fluid, the second end including the combination of a dispense outlet having a size and shape to selectively at least partially outwardly dispense fluid therefrom when the emergency wash unit is in an activation state and a recessed engagement groove formed in an outer periphery of the elongated body projecting outwardly from the emergency wash unit and proximate the dispense outlet, the recessed engagement groove having a size and shape for select direct water-tight attachment to a quickconnect coupler for confined channeling of fluid from the dispense outlet to a remote location when the emergency wash unit is in the activation state;
wherein the dispense outlet includes an outwardly diverging internal diameter for at least partially outwardly radially dispensing fluid from the emergency wash unit.

2. The shower head nozzle of claim 1, wherein the elongated body includes a step transitioning the first end having a first relatively larger cross section to an intermediate section adjacent the recessed engagement groove having a second relatively smaller cross-section, the step facilitating select engagement with the emergency wash unit.

3. The shower head nozzle of claim 1, wherein the first end mounts within the emergency wash unit in non-projecting relation relative thereto.

4. The shower head nozzle of claim 1, wherein the recessed engagement groove couples to the quick-connect coupler by snap-fit engagement.

5. The shower head nozzle of claim 1, including a fluid conduit fluidly coupled to and extending between the quick-connect coupler and a remote drain or a storage tank.

6. The shower head nozzle of claim 5, including a flow meter in-line with the fluid conduit for measuring a real-time flow rate of the fluid flowing through the dispense outlet when the emergency wash unit is in the activation state.

7. The shower head nozzle of claim 5, including a temperature sensor in-line with the fluid conduit for measuring a real-time water temperature of the fluid flowing through the dispense outlet when the emergency wash unit is in the activation state.

8. The shower head nozzle of claim 5, wherein the fluid conduit selectively couples to a portable storage tank for selectively receiving a quantity of fluid.

9. The shower head nozzle of claim 8, wherein the portable storage tank is associated with a portable storage and testing unit that includes a controller for recording a real-time flow rate and a real-time temperature of fluid flowing out from the dispense outlet.

10. The shower head nozzle of claim 1, wherein the elongated body comprises a cylindrical body and the recessed engagement groove comprises a circumferential recessed engagement groove having a diameter relatively smaller than a cylindrical cam-lock of the quick-connect coupler.

11. The shower head nozzle of claim 1, wherein the first end comprises a universal connector selectively engageable with multiple emergency wash units.

12. An shower head nozzle, comprising:
an elongated cylindrical body having a hollow interior for channeling fluid therethrough;
an upper end of the elongated cylindrical body is configured to couple to an emergency shower unit in fluid communication with a fluid source; and
a lower end of the elongated cylindrical body is configured to selectively receive and dispense fluid from the hollow interior, the lower end including the combination of a dispense outlet having an outwardly diverging internal diameter for at least partially outwardly radially dispensing fluid from the emergency shower unit and a circumferential recessed engagement groove formed in an outer diameter of the elongated cylindrical body and proximate the dispense outlet, the circumferential recessed engagement groove having a diameter relatively smaller than a cylindrical cam-lock of a quick-connect coupler for select water-tight snap-fit engagement therewith for constraining the at least partially outwardly radially dispensing fluid into a conduit coupled to the quick-connect coupler.

13. The shower head nozzle of claim 12, wherein the conduit comprises a pipe fitting or a hose fluidly coupled to and extend between the quick-connect coupler and a remote drain or a storage tank and wherein the elongated cylindrical body includes a step transitioning the upper end having a first relatively larger diameter to an intermediate section adjacent the circumferential recessed engagement groove having a second relatively smaller diameter, the step facilitating select engagement with the emergency shower unit.

14. The shower head nozzle of claim 13, including a temperature sensor in-line with the conduit for measuring a real-time water temperature of the fluid flowing through the dispense outlet when the emergency shower unit is in an activation state, wherein the upper end mounts within the emergency shower unit in non-projecting relation relative thereto.

15. The shower head nozzle of claim 13, including a flow meter inline with the conduit for measuring a real-time flow rate of the fluid flowing through the dispense outlet when the emergency shower unit is in an activation state.

16. The shower head nozzle of claim 15, wherein the portable storage tank is associated with a portable testing unit that includes a controller for recording the real-time flow rate and a real-time temperature of fluid flowing out from the dispense outlet and the upper end comprises a universal connector selectively engageable with multiple emergency shower units.

17. The shower head nozzle of claim 16, wherein the portable testing unit includes a screen for displaying the real-time flow rate and the real-time temperature.

18. The shower head nozzle of claim 12, wherein the cylindrical camlock comprises a diameter of at least one inch.

19. A process for testing an emergency shower unit, comprising the steps of:
mounting a first end of a shower head nozzle having an elongated body with a hollow interior for channeling fluid therethrough to a shower head with a second end projecting outwardly therefrom and having the combination of a dispense outlet for at least partially outwardly directing dispensing fluid therefrom and a recessed engagement groove formed in an outer periphery of the elongated body;

attaching a quick-connect coupler directly to the recessed engagement groove of the shower head nozzle in water-tight relation;

activating the emergency shower unit to produce a fluid flow to the shower head nozzle and out through the dispense outlet, the quick-connect coupler confining the fluid flow into a conduit coupled thereto for delivery to a remote location;

measuring at least one of a flow rate or a temperature of the fluid flow in real-time;

deactivating the emergency shower unit to cease the fluid flow through the dispense outlet of the shower head nozzle; and at least partially outwardly dispensing the fluid flow from the dispense outlet without the quickconnect coupler attached to the recessed engagement groove;

wherein the dispense outlet includes an outwardly diverging internal diameter for at least partially outwardly radially dispensing the fluid flow therefrom.

20. The process of claim 19, wherein the measuring step further includes measuring the real-time flow rate with a flow meter in-line with the conduit and measuring the real-time temperature with a temperature sensor in-line with the conduit.

21. The process of claim 20, including the step of recording the realtime flow rate and the real-time temperature.

22. The process of claim 20, including the step of displaying the real-time flow rate and the real-time temperature on a screen in real-time.

23. The process of claim 19, wherein the remote location comprises a drain or a storage tank.

24. A process for testing an emergency shower unit, comprising the steps of:

mounting a first end of a shower head nozzle having an elongated body with a hollow interior for channeling fluid therethrough to a shower head with a second end projecting outwardly therefrom and having the combination of a dispense outlet for at least partially outwardly directing dispensing fluid therefrom and a recessed engagement groove formed in an outer periphery of the elongated body;

attaching a quick-connect coupler directly to the recessed engagement groove of the shower head nozzle in water-tight relation;

activating the emergency shower unit to produce a fluid flow to the shower head nozzle and out through the dispense outlet, the quick-connect coupler confining the fluid flow into a conduit coupled thereto for delivery to a remote location;

measuring at least one of a flow rate or a temperature of the fluid flow in real-time;

deactivating the emergency shower unit to cease the fluid flow through the dispense outlet of the shower head nozzle; and connecting the conduit to a portable storage tank having a capacity for selectively receiving a quantity of fluid.

* * * * *